(12) United States Patent
Lu

(10) Patent No.: US 6,293,745 B1
(45) Date of Patent: Sep. 25, 2001

(54) SCREW WITH AN IMPROVED HEAD STRUCTURE AND PUNCH FOR FORMING SAME

(76) Inventor: Cheng Chuan Lu, Suite 3, 19th Floor, No. 50, Lane 355, Chung Hua Road, Yung Kang, Tainan Hsien (TW)

( * ) Notice: Subject to any disclaimer, the term of this patent is extended or adjusted under 35 U.S.C. 154(b) by 0 days.

(21) Appl. No.: 09/592,069

(22) Filed: Jun. 12, 2000

(30) Foreign Application Priority Data

Apr. 21, 2000 (TW) ............................................ 89206742 U

(51) Int. Cl.[7] ............................. F16B 23/00; F16B 35/06
(52) U.S. Cl. .......................... 411/410; 411/404; 411/919
(58) Field of Search .................................. 411/403, 404, 411/410, 919

(56) References Cited

U.S. PATENT DOCUMENTS

| | | | |
|---|---|---|---|
| 1,910,182 | * | 5/1933 | Robertson ............................. 411/410 |
| 2,400,684 | * | 5/1946 | Clark ................................. 411/404 X |
| 5,020,954 | * | 6/1991 | Dreger ............................... 411/410 X |
| 5,358,368 | * | 10/1994 | Conlan et al. ........................ 411/410 |

* cited by examiner

Primary Examiner—Neill Wilson
(74) Attorney, Agent, or Firm—Alan Kamrath; Rider, Bennett, Egan & Arundel, LLP

(57) ABSTRACT

A screw includes a shank and a head. The head includes a driving socket having a long slot that extends axially into the head to a depth. A first short recess is defined in a bottom wall defining the long slot and extended along a longitudinal axis of the long slot, the first short recess being narrower yet deeper than the long slot. A second short recess extends along an axis that is normal to the longitudinal axis of the long slot. The second short recess is as deep as the first short recess, the short recesses together defining a cross-shape recess for receiving a Phillips type screw driver, the cross-shape recess including four ends. The driving socket of the head further includes a square recess that is located within an area defined by the four ends of the short recesses, the square recess being adapted to receive a square socket type driver. The square recess extends axially into the head to a depth deeper than the short recesses. The square recess is defined by four sides and includes four apexes and two diagonal axes that intersect at an intersection. The intersection of the diagonal axes of the square recess is coincident with an intersection of the longitudinal axis and the axis that is normal to the longitudinal axis. One of the diagonal axes of the square recess is at an angle with the axis that is normal to the longitudinal axis, the angle being not equal to 45°.

20 Claims, 6 Drawing Sheets

SCREW WITH AN IMPROVED HEAD STRUCTURE AND PUNCH FOR FORMING SAME

BACKGROUND OF THE INVENTION

1. Field of the Invention

The present invention relates to a screw with an improved head structure, and more particularly to a screw head having a driving socket capable of receiving, a square socket (Robertson) type driver a cross-recess (Phillips) type screw driver, and a flat blade driver. The present invention also relates to a punch for forming such a driving socket in a screw head.

2. Description of the Related Art

U.S. Pat. No. 5,358,368 to Conlan et al. issued on Oct. 25, 1994 discloses a screw having a driving socket capable of receiving a square socket (Robertson) type driver, a cross-recess (Phillips) type screw driver, and a flat blade driver. In this patent, as illustrated in FIGS. 8 and 9 of the drawings, the driving socket of the head 41 of the screw 40 includes a square recess 42 defined by four vertical walls 43 for receiving a square type driver, aligned slots 45 extending radially outwardly in alignment with two diagonally located corners of the square recess 42 for receiving a flat blade driver, and four grooves 44 extending diagonally outwardly from the corners of the square recess 42 to define a cross-shaped recess to receive a cross-recess type screw driver. The square recess 42 is deeper than the grooves 44 which, in turn, is deeper than the slots 45. Nevertheless, it is found that the driving socket tends to be damaged at the corner areas 46 when driven by a Phillips type screw driver.

U.S. Pat. No. 5,674,037 to Lu issued on Oct. 7, 1997 discloses a screw having an improved head structure. In this patent, as illustrated in FIGS. 6 and 7 of the drawings, the head 31 of the screw 30 includes a substantially cubic recess 32 defined by four sides 33, each of the four sides 33 having a short slot 34 extending perpendicularly outwardly therefrom, and a long slot 35 extending perpendicularly to two opposite sides of the cubic recess 32. The head structure disclosed by Lu is intended to solve the problem of the screw disclosed by Conlan et al. Nevertheless, it is found that the user may place a Robertson type driver in a wrong position indicated by the dashed-dotted square 50. As a result, the driving socket tends to be damaged at the corner areas 36 when driven by a power-driven square type socket driver. Namely, the problem encountered by the screw disclosed by Conlan et al. cannot be avoided completely.

SUMMARY OF THE INVENTION

It is the primary object of the present invention to provide a screw having a driving socket capable of receiving a square socket (Robertson) type driver, a cross-recess (Phillips) type screw driver, and a flat blade driver, wherein the driving socket may reliably avoid wrong insertion of a Phillips type driver, thereby preventing damage to the screw head.

It is another object of the present invention to provide a punch for forming such a driving socket in the screw head.

A screw in accordance with the present invention includes a shank and a head. The head includes a driving socket having a long slot that extends axially into the head to a depth. A first short recess is defined in a bottom wall defining the long slot and extended along a longitudinal axis of the long slot, the first short recess being narrower yet deeper that the long slot. A second short recess extends along an axis that is normal to the longitudinal axis of the long slot. The second short recess is as deep as the first short recess, the short recesses together defining a cross-shape recess for receiving a Phillips type screw driver, the cross-shape recess including four ends. The driving socket of the head further includes a square recess that is located within an area defined by the four ends of the short recesses, the square recess being adapted to receive a square socket type driver. The square recess extends axially into the head to a depth deeper than the short recesses. The square recess is defined by four sides and includes four apexes and two diagonal axes that intersect at an intersection. The intersection of the diagonal axes of the square recess is coincident with an intersection of the longitudinal axis and the axis that is normal to the longitudinal axis. One of the diagonal axes of the square recess is at an angle with the axis that is normal to the longitudinal axis, the angle being not equal to 45°.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
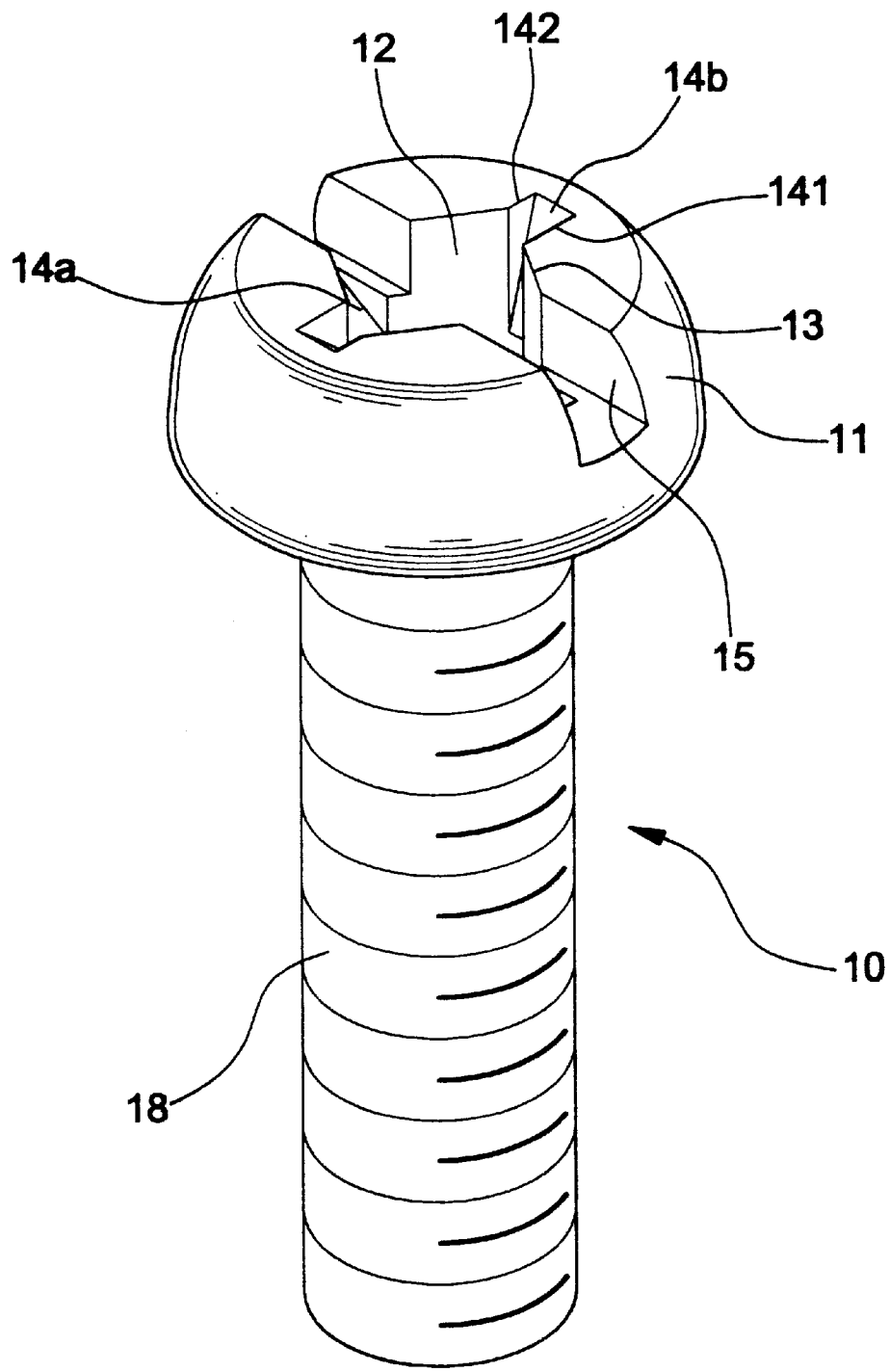
FIG. 1 is a perspective view of a screw with an improved head structure in accordance with the present invention.

Referring to FIGS. 1 through 5 and initially to FIGS. 1 through 4, a screw in accordance with the present invention generally includes a shank 18 and an integral head 11. The head 11 includes a driving socket having a long slot 15 that extends axially into the head 11 to a depth. A first short recess 14a is defined in a bottom wall defining the long slot 15 and extends along a longitudinal axis L of the long slot 15. The first short recess 14a is narrower yet deeper than the long slot 15. In addition, a second short recess 14b extends along an axis N that is normal to the longitudinal axis L of the long slot 15. The second short recess 14b is as deep as the first short recess 14a. The short recesses 14a and 14b are adapted to receive a Phillips type screw driver. In addition, a bottom wall of each short recess 14a, 14b may be inclined (see FIGS. 3 and 4) to generally correspond to the angle on the typical (Phillips) type cross-recess screw driver.

Figure 2:
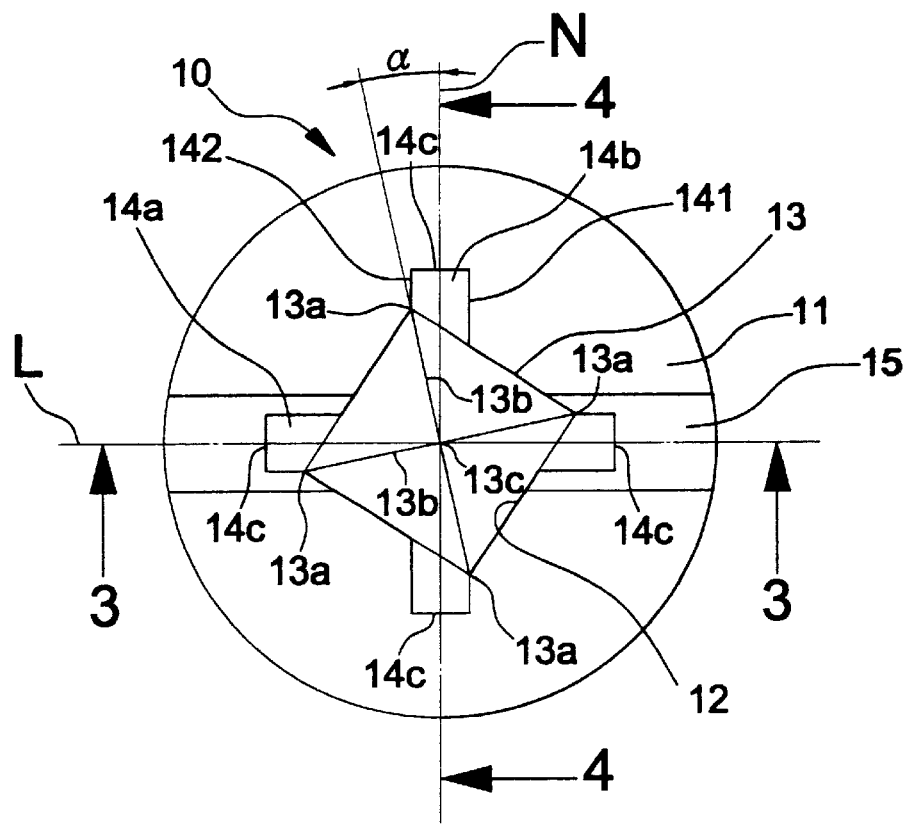
FIG. 2 is a top view of a head of the screw in FIG. 1.
Figure 3:
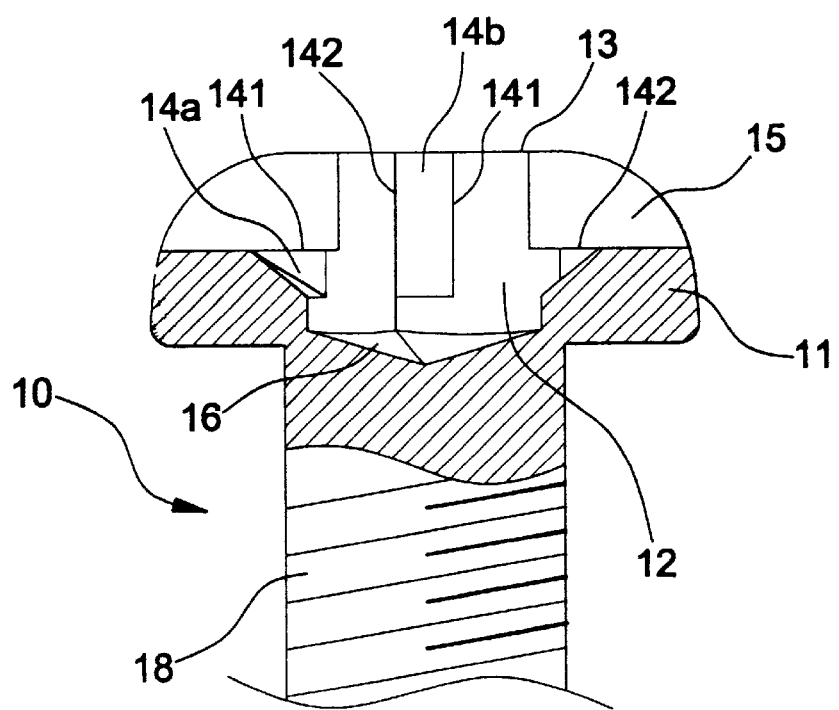
FIG. 3 is a sectional view taken along line 3—3 in FIG. 2.
Figure 4:
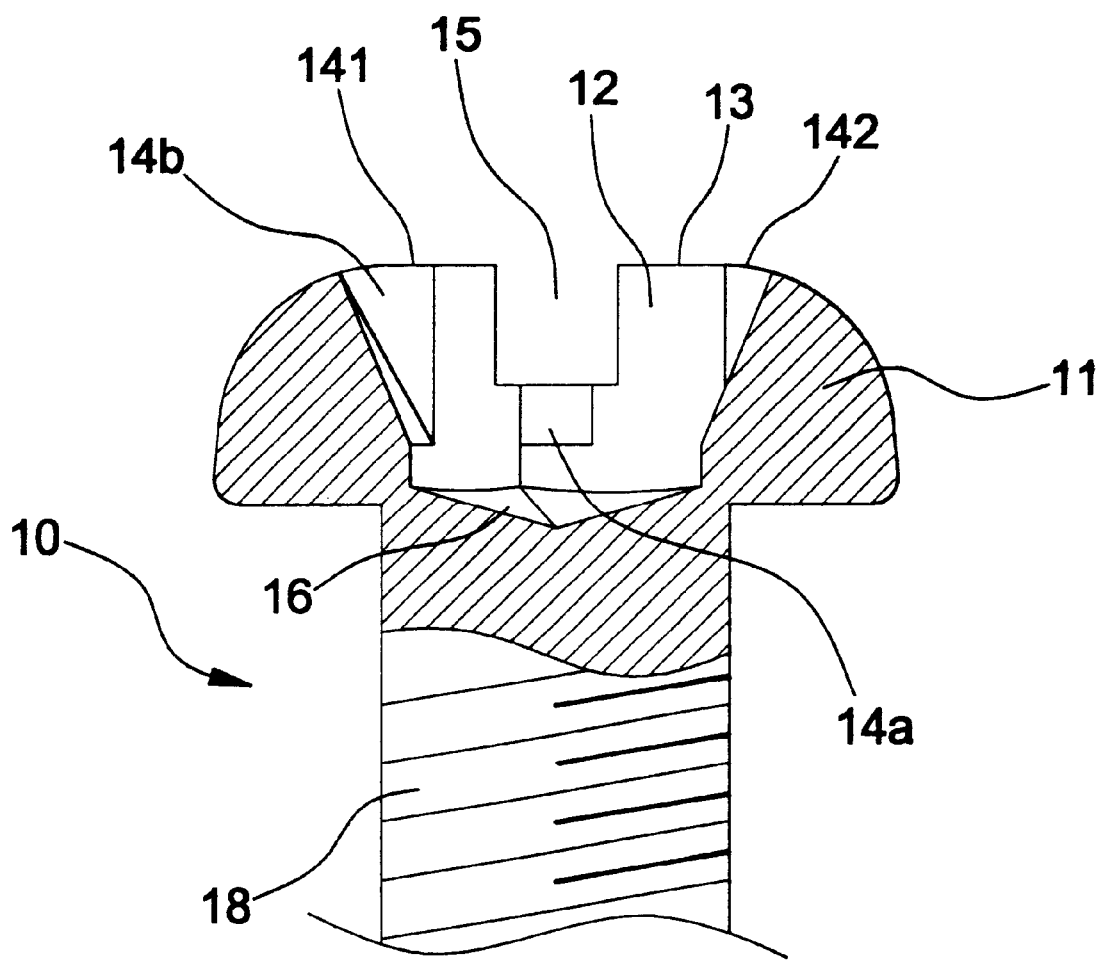
FIG. 4 is a sectional view taken along line 4—4 in FIG. 2.

The driving socket of the head 11 of the screw 10 further includes a square recess 12 that is located within an area defined by four ends 14c of the short recesses 14a and 14b. The square recess 12 extends axially into the head 11 to a depth deeper than the short recesses 14a and 14b. The square recess 12 is defined by four sides 13 and includes four apexes 13a and two diagonal axes 13b that intersect at 13c. It is noted that the intersection 13c of the diagonal axes 13b of the square recess 12 is coincident with the intersection of the longitudinal axis L and the axis N that is normal to the longitudinal axis L. Of more importance, the diagonal axis 13b of the square recess 12 is at an angle α with the axis N that is normal to the longitudinal axis L. The angle α is not equal to 45°, preferably less than 45°. By such an arrangement, it is impossible to insert a square socket type driver (particularly a power-driven square socket type driver) into a wrong position. Potential damage to the screw head is thus avoided. In addition, as illustrated in FIG. 2, the resultant structure of each short recess 14a, 14b includes a relatively longer side 141 and a relatively shorter side 142. The relatively longer side 141 provides a larger area for contact with the side 13 defining the square recess 12, thereby improving the torque-bearing capacity when tightening the screw 10. The bottom 16 of the square recess 12 includes a very shallow V-shape, best shown in FIGS. 3 and 4.

Figure 5:
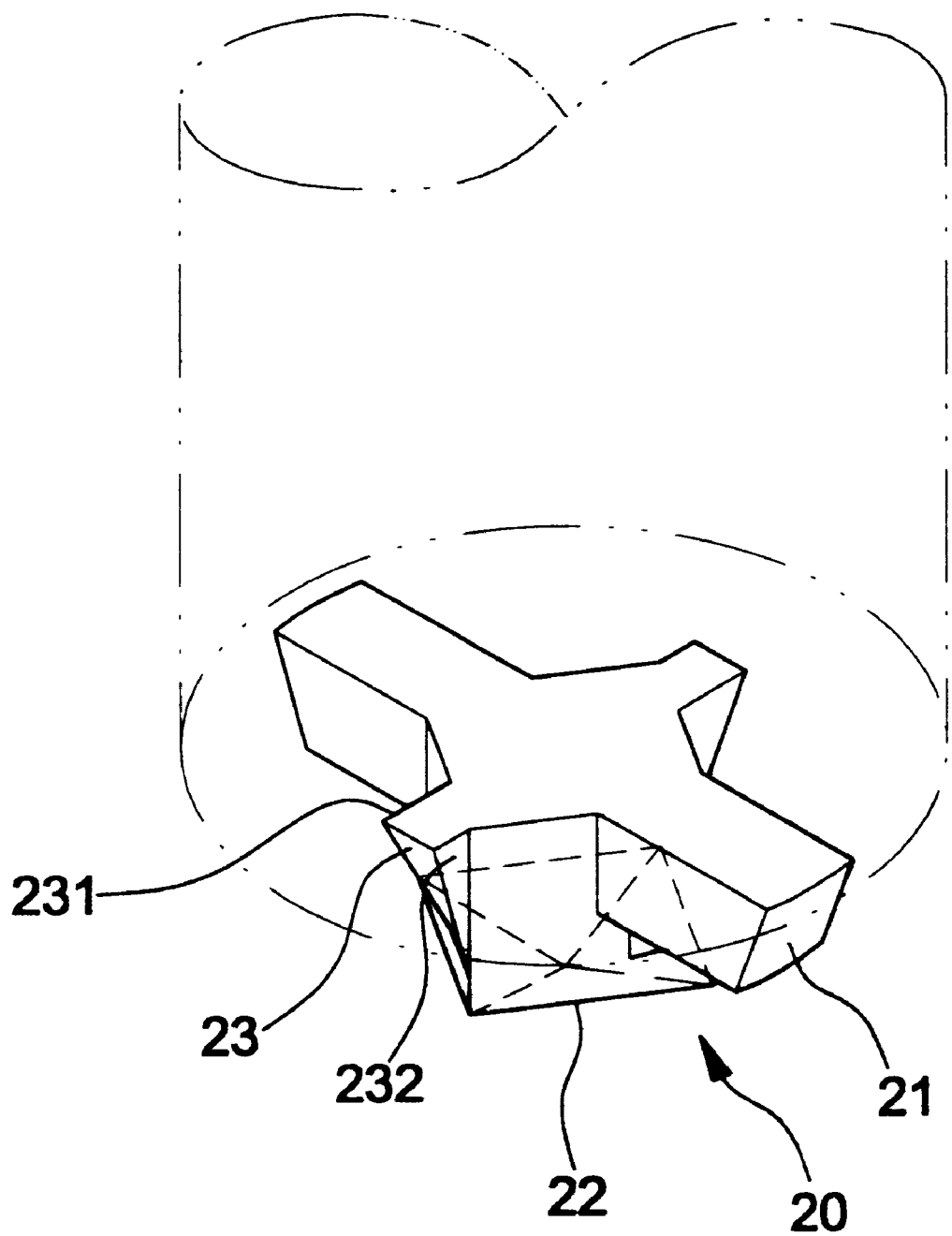
FIG. 5 is a perspective view of a punch for forming the head structure of the screw in accordance with the present invention.
Figure 6:
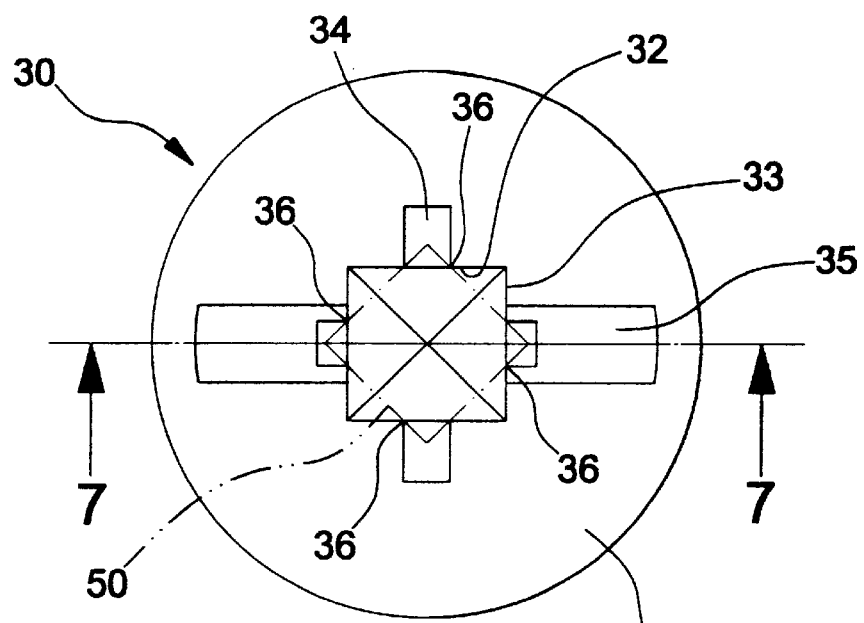
FIG. 6 is a top view of a conventional screw head.
Figure 7:
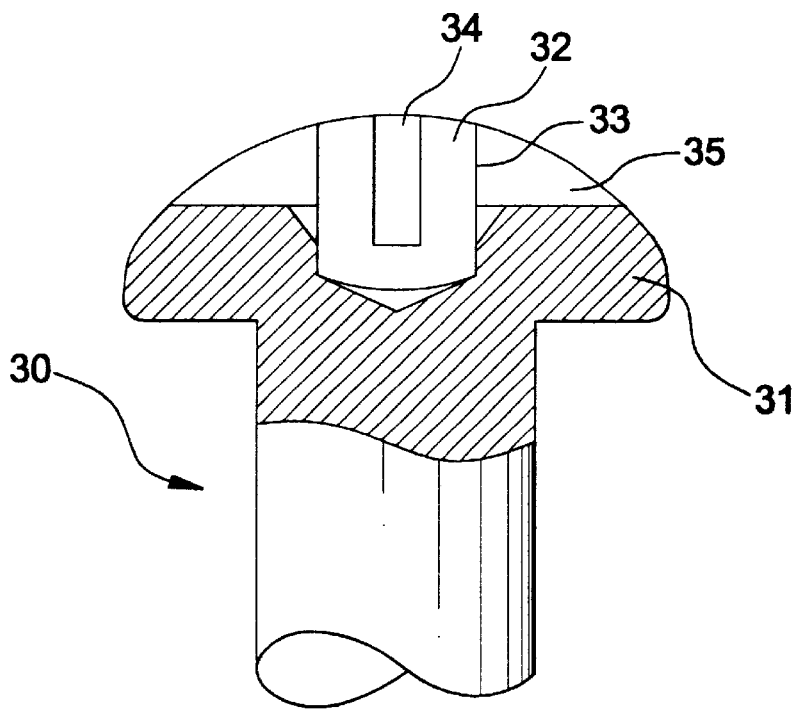
FIG. 7 is a sectional view taken along line 7—7 in FIG. 6.
Figure 8:
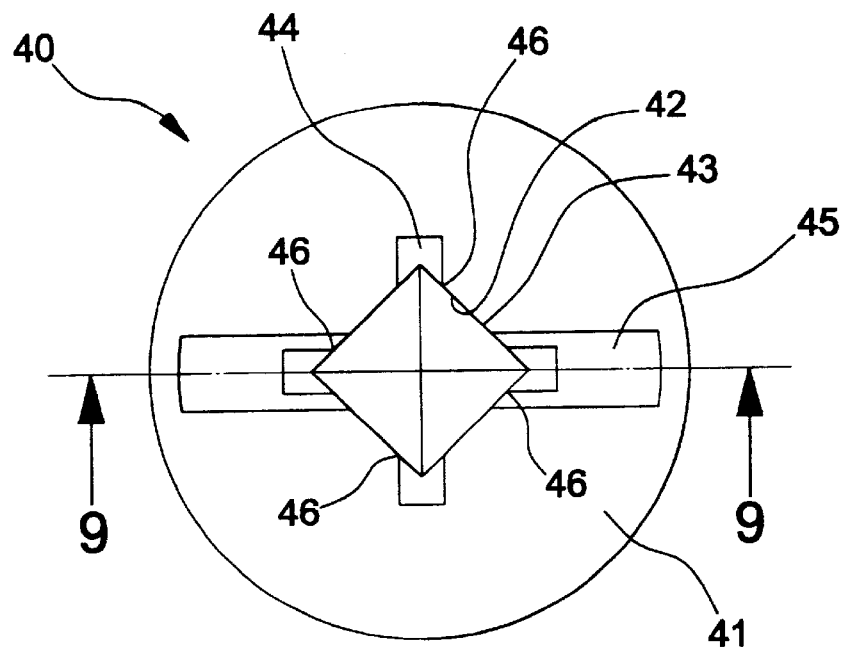
FIG. 8 is a top view of another conventional screw head.
Figure 9:
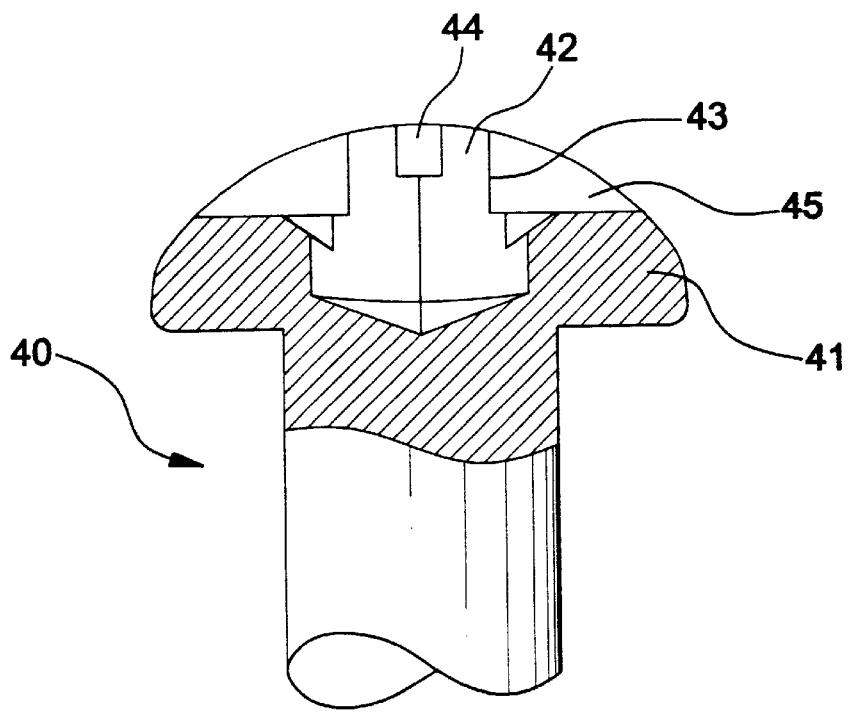
FIG. 9 is a sectional view taken along line 9—9 in FIG. 8.

FIG. 5 illustrates a punch 20 for forming the above-mentioned head structure 11 of the screw 10. The punch 20 includes a rectangular parallelepiped 21, a square block 22 that is formed on a mediate section of the rectangular parallelepiped 21, and a triangular pyramid 23 that are extended from two opposite vertical edges of the square block 22. Each triangular pyramid 23 includes a relatively long side 231 and a relatively short side 232 to form the relatively longer side 141 and the relatively shorter side 142 of each short recess 14a, 14b. It is appreciated that the punch 20 is used to form a head structure shown in FIGS. 1 through 4.

Although the invention has been explained in relation to its preferred embodiment, it is to be understood that many other possible modifications and variations can be made without departing from the spirit and scope of the invention as hereinafter claimed.

What is claimed is:

1. A screw comprising a shank and a head, the head including a driving socket having a first recess that extends axially into the head to a depth and extending along a longitudinal axis, and having a second recess extending along an axis that is normal to the longitudinal axis of the first recess, the first and second recesses together defining a cross-shape recess for receiving a Phillips type crew driver;

the driving socket of the head further including a square recess, the square recess being adapted to receive a square socket type driver, the square recess being defined by four sides and including four apexes and two diagonal axes that intersect at an intersection, the intersection of the diagonal axes of the square recess being coincident with an intersection of the longitudinal axis and the axis that is normal to the longitudinal axis, one of the diagonal axes of the square recess being at an angle with the axis that is normal to the longitudinal axis, the angle being not equal to 0°, 45° or 90°.

2. The screw as claimed in claim 1, wherein the angle between the diagonal axis of the square recess and the axis that is normal to the longitudinal axis is less than 45°.

3. The screw as claimed in claim 2, with the cross-shape recess including four ends, with the square recess located within an area defined by the four ends of the first and second recesses.

4. The screw as claimed in claim 3, with the square recess extending into the head to a depth deeper than the first and second recesses.

5. The screw as claimed in claim 4, with the second recess being as deep as the first recess.

6. The screw as claimed in claim 5, further comprising, in combination: a long slot extending axially into the head to a depth and extending along the longitudinal axis, with the first recess being deeper than the long slot and shorter than the long slot.

7. The screw as claimed in claim 6, with the first recess being narrower than the long slot.

8. The screw as claimed in claim 7, with the first recess being narrower than the long slot.

9. The screw as claimed in claim 1, with the cross-shape recess including four ends, with the square recess located within an area defined by the four ends of the first and second recesses.

10. The screw as claimed in claim 9, with the square recess extending into the head to a depth deeper than the first and second recesses.

11. The screw as claimed in claim 10, with the second recess being as deep as the first recess.

12. The screw as claimed in claim 11, further comprising, in combination: a long slot extending axially into the head to a depth and extending along the longitudinal axis, with the first recess being deeper than the long slot and shorter than the long slot.

13. The screw as claimed in claim 1, with the square recess extending into the head to a depth deeper than the first and second recesses.

14. The screw as claimed in claim 13, with the second recess being as deep as the first recess.

15. The screw as claimed in claim 14, further comprising, in combination: a long slot extending axially into the head to a depth and extending along the longitudinal axis, with the first recess being deeper than the long slot and shorter than the long slot.

16. The screw as claimed in claim 15, with the first recess being narrower than the long slot.

17. The screw as claimed in claim 1, with the second recess being as deep as the first recess.

18. The screw as claimed in claim 17, further comprising, in combination: a long slot extending axially into the head to a depth and extending along the longitudinal axis, with the first recess being deeper than the long slot and shorter than the long slot.

19. The screw as claimed in claim 1, further comprising, in combination: a long slot extending axially into the head to a depth and extending along the longitudinal axis, with the first recess being deeper than the long slot and shorter than the long slot.

20. The screw as claimed in claim 19, with the first recess being narrower than the long slot.

* * * * *